May 28, 1968
L. A. ROSENTHAL
3,385,966
CORONA DISCHARGE ELECTRODES OF OPPOSING POLARITY ROTATABLE
ABOUT A COMMON AXIS TO TREAT POLYMER SURFACES
Filed Dec. 30, 1964
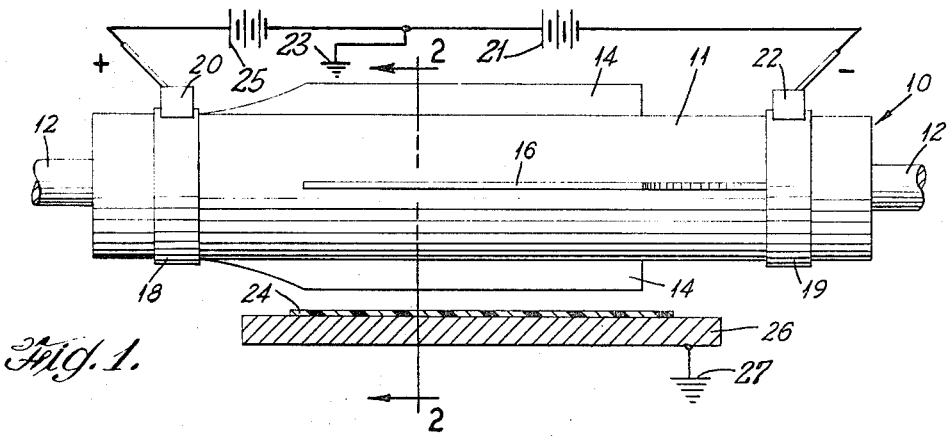
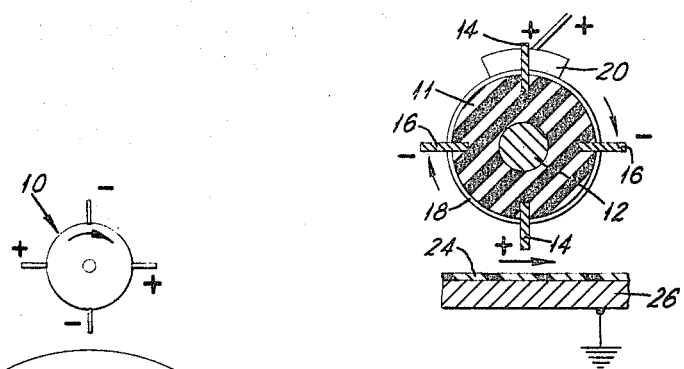
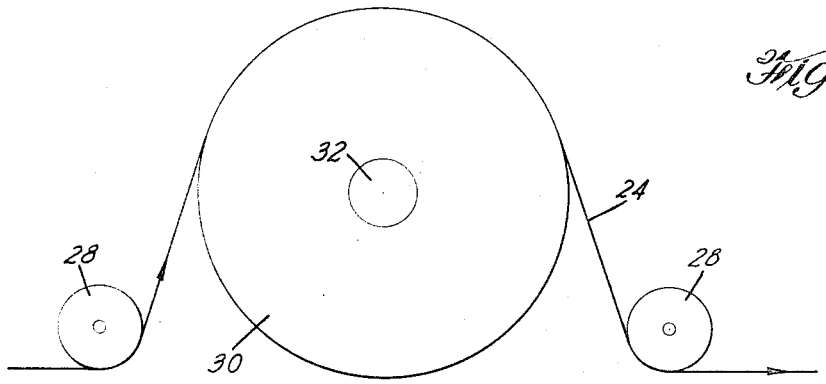
INVENTOR.
LOUIS A. ROSENTHAL
BY
ATTORNEY United States Patent Office 3,385,966
Patented May 28, 1968

3,385,966
CORONA DISCHARGE ELECTRODES OF OPPOSING POLARITY ROTATABLE ABOUT A COMMON AXIS TO TREAT POLYMER SURFACES
Louis A. Rosenthal, Highland Park, N.J., assignor to Union Carbide Corporation, a corporation of New York
Filed Dec. 30, 1964, Ser. No. 422,234
8 Claims. (Cl. 250—49.5)

ABSTRACT OF THE DISCLOSURE

Apparatus is provided for DC corona discharge treatment of plastic surfaces wherein at least two electrodes of opposing polarity are rotated about a common axis, to pass in sequence in ionizing gap proximity with such plastic surface. DC potential is thus utilized to produce corona discharge treatment of, for example plastic film for improved coating and ink receptivity.

---

This invention relates to the treating of plastic surfaces, particularly an apparatus for improving the exposed surface adhesion qualities of plastic film or sheet for receptivity to coatings such as ink and adhesion of other materials to the plastic surface.

The use of plastic materials including film or sheet in applications such as packaging is widespread and finding increasing commercial acceptance. Concurrently, it has become increasingly desirable to adhere various materials to these plastics including coatings such as inks for strengthening, decorating, labeling or otherwise enhancing the use thereof. However, many untreated plastic surfaces are practically unreceptive to such materials including printing ink and do not lastingly adhere thereto. When, for example, polyethylene film is imprinted with any of the various known types of inks, the dried imprints do not adhere to the surface and can be removed by very little effort as by slight abrasions.

Several devices are available in the art for the treatment of plastic films to increase the plastic surface receptivity to inks and the like. See, for example, United States Patent 2,810,933 to R. F. Pierce et al. and United States Patent 3,018,189, to G. W. Traver. In general, these devices provide for passing a strip of film between at least two spaced electrodes while delivering alternating current thereto to subject the film to high voltage electrostatic discharge. This treatment, also known as alternating current corona discharge, renders the surface of the film exceptionally receptive to other materials so that imprints and coatings adhere very tenaciously to the film surface.

However, there are several drawbacks associated with alternating current corona-discharge devices in the treatment of plastic surfaces. For example, under such treatment the corona-discharge is developed only during the peaks of the sinusoidal voltage and the treatment can be intermittent and non-uniform. Poor system power factors and large ohmic losses often accompany such pulsating or AC voltages.

DC voltages can be conveniently supplied to various machines without the above problems of high voltage AC distribution. However, where a DC voltage is applied across two spaced electrodes, such as provided in the above devices, the entry of plastic film therebetween blocks corona-discharge since the film serves as an effective insulator. Thus, such devices have rpovided only AC corona treatment of plastic surfaces with the above attendant difficulties.

Accordingly, it is an object of this invention to provide an apparatus for rendering plastic surfaces more evenly receptive and retentive to coatings thereon under an improved corona aura.

It is another object of this invention to provide an apparatus for direct current corona-discharge treating of plastic surfaces.

These and other objects are accomplished in tne present invention which provides an apparatus for corona-discharge treating of polymer surfaces for improved adhesion of coatings thereon comprising at least two electrodes of opposing polarity adapted to be rotated about a common axis to define peripheries of substantially equal radii thereabout, said electrodes being radially spaced and electrically insulated from one another; a polymer surface spaced proximate at least a portion of each of said peripheries to provide an ionizing atmosphere gap therebetween; a current conducting material on the reverse side of said polymer surface in intimate contact therewith and electrically isolated from said electrodes; means for delivering direct current potential to said electrodes of sufficiently high magnitude to ionize the atmosphere in said gap; and means for rotating the electrodes for passing in sequence electrodes of opposing polarity by said polymer surface in said gap developing a direct current aura therebetween.

The invention will become more apparent from the following detailed specification and drawings, in which:

FIGURE 1 is a partial sectional elevation illustrating the apparatus embodying the invention including the electrode assembly;

FIGURE 2 is a sectional elevation of the apparatus of FIGURE 1 taken on line 2—2 looking in the direction of the arrows, and FIGURE 3 is a schematic elevation of another embodiment of the invention showing the electrode assembly and roller means for conveying the film thereby.

Referring now to the drawings, electrode assembly 10 is mounted on rotatable drive shaft 12 as shown in FIGURES 1 and 2. Electrode assembly 10 includes positive blade electrodes 14 connected to slip ring 18 and negative blade electrodes 16 connected to slip ring 19, all rigidly affixed to dielectric core 11. The negative and positive electrodes are insulated from each other and radially spaced around the core 11. Positive brush 20 and negative brush 22 which contact respectively slip rings 18 and 19, are adapted to be connected across a high potential DC source having, for example, DC voltage sources 19 and 21 connected in series and a ground, center tap 23, connected therebetween for imparting a high positive potential to positive electrodes 14 and a high negative potential to negative electrodes 16. The high potential DC source, however, can be any means convenient to the skilled practitioner for imparting the above high potentials to the electrodes 14 and 16.

Plastic sheet 24 is supported in proximity with the electrode assembly 10 but spaced from the paths or the peripheries circumscribed by the electrodes 14 and 16, when rotated, to provide an ionizing air gap between plastic sheet 24 and a given electrode as it passes in proximity therewith.

A current conducting member 26 is situated on the reverse side of the plastic sheet 24 in intimate contact therewith. Member 26 is electrically isolated from the electrodes 14 and 16, can serve as a support for the plastic sheet 24 and can be grounded as by tap 27, if desired.

In operation, brushes 20 and 22 are connected across a high potential DC source imparting high positive and negative potentials respectively to the positive and negative electrodes 14 and 16. The drive shaft 12 is rotated by drive means (not shown) causing the positive and negative electrodes 14 and 16 to rotate in sequence by the plastic sheet in the gap developing direct current aura therein.

Thus, when voltage is applied to the electrode assembly a high electric field is created at the blade edges of the electrodes. The positive and negative electrodes have opposite potential gradients which ionize the air about them. As each electrode is rotated over the plastic sheet, or other plastic surface in the gap, charges of like polarities are sprayed on to such surface. A layer of charge is thus deposed on the plastic surface which is then reversed as the next electrode of opposite potential sweeps into gap proximity therewith. During this charge activity a visible corona aura appears and the surface is rendered increasingly receptive to the adherence of coatings or other materials thereon. For continuous treatment, the plastic sheet 26 can be passed over the conductive member 26 as shown in FIGURE 2 or the conductive member 26 can serve to convey the sheet 24 through the gap.

A preferred embodiment of the invention is illustrated in FIGURE 3 where plastic sheet 24 is conveyed past electrode assembly 10 by conductive roller 30 and guide rollers 28. The electrode assembly 10 is spaced from the plastic sheet 24 in contact with conductive roller 30 to provide a suitable ionizing air gap as above. The rollers 30 and 28 are rotated by conventional drive means (not shown).

It is important that a surface of the polymer material to be treated be in contact with the current conducting member either directly or through another dielectric material interposed therebetween so that the reverse surface of the polymer material will substantially assume by induction the polarity of the metal for effective corona-discharge. Moreover, the plastic surface should be in intimate contact with the conductive member or intervening dielectric material to prevent air pockets from forming therebetween. Such pockets cause spotty non-uniform treatment of the plastic surface in the gap and also allow corona-discharge treatment to occur on the reverse side of the plastic surface. Treatment on both sides of a plastic surface is usually undesirable. For example, plastic film so treated will adhere to itself when wound on a roll, considerably impairing its value.

In addition, the conducting member must also be electrically isolated from the electrodes. The above polymer material, for example, when placed in the ionizing air gap serves to electrically isolate the conductive member from the passing electrodes so that no breakdown, arcing or sparking can occur therebetween to considerably reduce the field intensity and resultant corona in the gap.

The apparatus of the invention will successfully treat polymer surfaces though the conductive member is not connected to ground. Preferably, however, the conductive member is connected to ground to bleed off any accumulated charges or otherwise maintain the member at ground potential and assure uniform treatment of a given polymer surface.

The current conducting member is preferably of metal or other similar conductive material. It can, for example, be a flat metal plate or metal surfaced roll on which the polymer material is conveyed or slides. Similarly, it can be a metal foil laminated to a polymer surface or a metal wire or cable having a polymer coating thereon. It may also be an electrolyte solution of high conductivity or a thin vacuum deposited metallic coating on the polymer surface. Conducting rubber or plastic compositions or other suitable conductive materials may be used.

The apparatus of this invention can be applied to plastic surfaces of any kind including sheet or film. Highly desirable results are also secured with polymer coated metal foils, wire and cables in which the metal component serves as the conductive medium or member. It is similarly possible to employ the invention on molded or extruded objects of various shapes such as bottles, pipes, fibers and the like wherein the conductive medium is placed in contact with the reverse side of the polymer surface to be treated. For example, where the outside surface of a plastic bottle is to be treated, electrolyte introduced therein can serve as the conductive medium.

While many different electrodes can be employed in this invention, it is necessary that the electrodes 14 and 16 have edges or points of small radius of curvature to provide a high voltage gradient across the space where the corona aura is to be developed. Thus, the electrodes may take the shape of knife or hack saw blades, thread screws, wires and the like.

The electrode assembly includes two or more electrodes of opposing polarity mounted to rotate about a common axis. The electrodes are mounted about a dielectric core, either of air as where the electrodes define a fork or cage-like structure or of dielectric material with the electrodes either projecting from, flush with or slightly recessed below the periphery thereof. Preferably, the electrodes are mounted to a core of rigid dielectric material of, for example, glass reinforced melamine. However, any suitable dielectric core material can be used including epoxy materials.

It is important that electrodes of opposing polarity are electrically insulated and radially spaced from one another so that positive and negative electrodes pass a given point in sequence when the electrode assembly is rotated. Where there are more than two electrodes, then electrodes of like polarity can also be radially spaced from one another in any desired succession with electrodes of opposing polarity. Preferably, however, electrodes of opposing polarity are radially spaced around the core in alternating succession so that radially adjacent electrodes have opposing polarity and can be rotated past a given point in regular sequence.

The electrodes of opposing polarity are spaced apart sufficiently enough or otherwise insulated so that no arcing occurs therebetween. Within this limitation and that of overall size requirements, any number of electrodes may compose the electrode assembly of the invention.

As previously indicated, this plastic surface is supported in proximity with the electrode assembly, but spaced from the paths or peripheries circumscribed by the electrodes, when rotated to provide an ionizing gap between the surface and a given electrode as it passes in the vicinity thereof. The electrodes preferably extend substantially equal distances from their common axis to define peripheries of substantially equal radii to provide correspondingly equal gaps with the plastic surface. However, it will be recognized that the electrodes may extend unequal distances from the axis as long as each provides the above ionizing gap with the plastic surface, i.e., passes in gap proximity therewith.

The length of the ionizing gap is not narrowly critical. Inasmuch as the apparent intensity of the field generating the corona is a factor of distance from the surface, it is preferred to have the electrodes rotate as close thereto as possible, i.e., about $1/8$ to $1/64$ inch, although effective corona is developed at much greater distances, even up to $1/4$ inch or more.

The corona atmosphere is preferably air but may be any gas that may be ionized to form effective corona. Such gases are well known in the art and include oxygen, sulfur dioxide or nitrogen.

The voltage applied to the electrodes should be of high magnitude of from 10,000 to 40,000 volts or more for effective corona discharge. It has been found, for example, that for an air gap of about $1/10$ of an inch, an applied potential of 10,000 volts is suitable for effective surface treatment of plastic film.

Current limiting resistance can be placed in series with the positive and negative electrodes, as a safeguard, to limit the current to a value, for example, below 100 milliamperes in the event of sparking across the gap. However, such resistors can be dispensed with in the apparatus of the invention since the conductive member is electrically isolated from the electrodes as discussed.

To further cover the possibilities of sparking between electrode and conductive material, a layer of dielectric material may be placed between conductive member and the plastic surface to be treated or the electrode edges may be covered with a dielectric material.

Two rotatably mounted electrodes of opposing polarity will successfully treat plastic surfaces with a minimum of one sweep each past the gap. However, the effectiveness of the treatment will increase with the number of sweeps of opposing electrode pairs past the plastic surface and will be determined by the desired application of adherents thereto.

The plastic surface to be treated is preferably passed in gap proximity with the electrode assembly in the opposite direction of rotation of the electrodes. However, successful treatment may be obtained where the plastic surface is at rest or moves in the direction of electrode rotation.

The DC discharge developed by the apparatus of the invention provides a relatively cold corona for treating plastic surfaces, i.e., there is substantially no heat build up which can, for example, shrink or ripple oriented plastic film as happens with the hot corona or arc of AC corona treatment.

The following is illustrative of the practice of the present invention for rending polyethylene film receptive to conventional printing inks.

*Example 1*

Several trials were made on sheets of .003 by 23 inch polyethylene film by means of an electrode assembly and conductive roll similar to the arrangement shown in FIGURE 3. The electrode assembly had 8 radially spaced blade electrodes including 4 positive and 4 negative electrodes in alternate succession and defined a cylinder about 6 inches in diameter. The electrodes were 22 inches long.

The equipment was set to provide, with the film in place, an air gap of about 1/10 inch. The electrode assembly was rotated at 3450 r.p.m. corresponding to an electrode sweep speed of about 5420 feet per minute while the film was passed by the gap in a direction opposite that of electrode rotation at 50 feet per minute.

The following treatment levels were obtained for the applied voltages and current tabulated below.

TABLE I

|  | Current, ma. | Treatment Level, dynes/cm. |
| --- | --- | --- |
| Voltage, iv.: |  |  |
| 10 | 11 | 56 |
| 9 | 10 | 56 |
| 8 | 7 | 52-54 |

The Treatment Level is a measure of surface tension in dynes per centimeter and is a measure of the retentiveness of a surface to adherents. The untreated film had a surface tension of 32 dynes/cm. A level of 40 dynes/cm. is considered satisfactory. All of the above trials produced a treatment level of over 50 dynes/cm. and the treated films when coated with a commercial lithographic ink and then dried, adhered very tenaciously thereto.

The observed corona was intense, cold and uniform and produced an even surface treatment on the film.

The present invention thus provides a means for rendering plastic surfaces receptive and retentive to itself or other materials including coatings. Such materials include printing ink, a barrier coating such as moisture vapor, or oxygen barrier coatings of epoxy, vinyl and the like, other polymers or resins or other dissimilar materials normally applied to such treated surfaces.

What is claimed is:

1. An apparatus for corona-discharge treating of polymer surfaces for improved adhesion of coatings thereon comprising:

at least two electrodes of opposing polarity adapted to be rotated about a common axis to define peripheries of substantially equal radii about said axis, said electrodes of opposing polarity being radially spaced and electrically insulated from one another;

said electrodes being spaced from the polymer surface to be treated to provide an ionizing gap between said electrodes and said surface when said electrodes are rotated past said surface;

a current conducting material on the reverse side of said polymer surface in intimate contact therewith and electrically isolated from said electrodes;

means for delivering direct current potential to each of said electrodes of sufficiently high magnitude to ionize the atmosphere in said gap; and means for rotating said electrodes of opposing polarity a plurality of cycles past the polymer surface being treated so that each portion of said surface is exposed to a plurality of sweeps of said electrodes developing a direct current corona aura therebetween.

2. The apparatus of claim 1 wherein means are provided for moving said polymer surface through said gap.

3. The apparatus of claim 1 having a plurality of radially spaced electrodes disposed about a common axis and means for delivering opposing direct current potentials to radially adjacent electrodes.

4. The apparatus of claim 1 having a plurality of electrodes of like potential in substantial radial alignment.

5. The apparatus of claim 1 wherein said electrodes project from a substantially rigid dielectric core.

6. The apparatus of claim 1 wherein said electrodes are provided with projections of small radius of curvature.

7. The apparatus of claim 1 wherein the current conducting material is in the form of a rotatably mounted cylinder, the polymer material is thermoplastic film in close contact with a portion of the periphery thereof and means for rotating the cylinder is provided to pass the polymer by the gap.

8. The apparatus of claim 1 wherein a thin film of dielectric material is interposed between conductive material and polymer material.

References Cited

UNITED STATES PATENTS 2,790,082  4/1957  Gundlack _____ 250—49.5
2,864,756  12/1958 Rothacker _____ 204—168
3,254,215  5/1966  Oliphant _____ 250—49.5

WILLIAM F. LINDQUIST, *Primary Examiner.*

RALPH G. NILSON, *Examiner.*